United States Patent
Sesma

[11] Patent Number: 6,073,256
[45] Date of Patent: Jun. 6, 2000

[54] DIGITAL PRODUCT EXECUTION CONTROL

[75] Inventor: Jimmy L. Sesma, White City, Oreg.

[73] Assignee: Preview Systems, Inc., Portland, Oreg.

[21] Appl. No.: 08/837,018

[22] Filed: Apr. 11, 1997

[51] Int. Cl.[7] .............................. G06F 11/00; G06F 19/00
[52] U.S. Cl. ....................................... 714/38; 364/468.01
[58] Field of Search ........................ 364/468.01, 468.02,
364/468.19, 468.23; 700/95, 920.1, 917;
395/701, 800.41, 712, 385, 183.14, 800.37;
714/38

[56] References Cited

U.S. PATENT DOCUMENTS

| | | | |
|---|---|---|---|
| 4,465,901 | 8/1984 | Best | 713/190 |
| 4,528,643 | 7/1985 | Freeny, Jr. | 380/4 |
| 5,224,166 | 6/1993 | Hartman | 713/190 |
| 5,307,504 | 4/1994 | Robinson et al. | 395/800.41 |
| 5,341,429 | 8/1994 | Stringer et al. | 380/23 |
| 5,509,070 | 4/1996 | Schull . | |
| 5,535,329 | 7/1996 | Hastings . | |
| 5,544,356 | 8/1996 | Robinson et al. | 395/182.03 |
| 5,584,023 | 12/1996 | Hsu | 707/202 |
| 5,629,980 | 5/1997 | Stefik | 380/4 |
| 5,673,315 | 9/1997 | Wolf . | |
| 5,677,953 | 10/1997 | Dolphin | 705/51 |
| 5,745,678 | 4/1998 | Herzberg | 713/200 |
| 5,757,908 | 5/1998 | Cooper | 713/165 |
| 5,815,653 | 9/1998 | You et al. | 395/183.14 |
| 5,826,011 | 10/1998 | Chou | 713/200 |
| 5,870,543 | 2/1999 | Ronning . | |
| 5,883,954 | 3/1999 | Ronning | 705/52 |
| 5,883,955 | 3/1999 | Ronning | 705/52 |

FOREIGN PATENT DOCUMENTS

WO 98/33106  7/1998  WIPO .

Primary Examiner—Robert W. Beausoliel, Jr.
Assistant Examiner—Pierre E. Elisca
Attorney, Agent, or Firm—Keith A. Cushing

[57] ABSTRACT

Digital product execution control as disclosed contemplates production of a final version of a digital product and subsequently imposing execution control on that digital product. The manufacturer of the original digital product need not incorporate execution control features into the final version of the product. Execution control programming attaches to an executable file of the digital product to create a controlled executable file. Upon loading and execution of the controlled executable file, the resulting operating environment is insufficient for the original executable file, and control programming determines whether or not execution will be allowed. If allowed, control programming creates the necessary operating environment for the digital product, i.e., as would be provided by the operating system if loaded normally, and allows execution of the digital product only under controlled conditions, e.g., such as under an evaluation use of the digital product.

25 Claims, 7 Drawing Sheets

DIGITAL PRODUCT EXECUTION CONTROL

RELATED APPLICATIONS

The present application relates to co-pending application serial No. 08/837,019 filed concurrently herewith Apr. 10, 1997 and entitled Digital Product Execution Control And Security.

FIELD OF THE INVENTION

The present invention relates generally to product production and distribution, and particularly to digital product production and distribution including distribution of digital products in an execution controlled form.

BACKGROUND OF THE INVENTION

Digital products, e.g., computer software and data, have been published widely through a variety of methods and mediums. Publishers have sold and distributed digital products like other products, e.g., packaged and available at retail outlets or through catalog and mail-order delivery. The nature of digital products, however, lends itself to non-traditional methods of distribution. Because common devices, e.g., personal computers and modems, duplicate digital material without degradation, consumers can copy and distribute reliably most digital products. Examples include shareware and distribution by modem via computer bulletin boards or the well-known Internet global communication medium. A second popular digital product distribution mechanism is CD-ROM, a relatively inexpensive medium having vast storage capacity, allowing publishers to distribute on a single disk a large volume of digital material including supporting documentation and manuals.

Such methods of broad distribution attract both publishers and end-users of digital products. Widespread distribution of fully functional digital products occurs accurately and without significant cost to the publisher. End-users access a variety of products for comparison with opportunity to actually try each product before making a decision to purchase. In essence, the end-user receives the fully functional digital product as an offer to purchase based on an opportunity to fully evaluate the actual product. The publisher profits when the evaluation process yields sufficient purchasers. This "try-before-you-buy" distribution mechanism is especially attractive in the context of global communication networks such the Internet where distribution occurs globally at minimal cost and where an enormous number of potential purchasers of digital products interact.

Unfortunately, the ability to accurately copy and make use of digital products lends itself to unauthorized use of digital products by unauthorized users. For example, persons using the digital product fully and indefinitely beyond an initial evaluation period take value from the publisher. Digital products may be easily reproduced and the publisher can take advantage of this characteristic as a distribution mechanism, however, the publisher risks unauthorized use and lost sales under such a distribution mechanism without some form of control over product execution. The digital product publisher taking advantage of such broad distribution schemes must implement some form of control to prevent unauthorized use of the digital product while still making the product widely available for consumer-evaluation.

Early attempts to control use of published digital products included distribution of an "evaluation" copy of a digital product. The evaluation copy, "diminished" relative to the actual product, introduced the consumer to the product, but wouldn't allow or even include code supporting fully functional use. To produce the evaluation copy, the product author, e.g., programmer, would rewrite the product in an alternate, i.e., less functional, form. In such product re-design process, difficult issues arose with respect to the degree of inoperability established relative to the fully operational form of the product. Furthermore, a consumer wishing to purchase the product following trial use of the evaluation copy had to obtain a fully functional version through traditional, e.g., retail, distribution mechanisms.

A second, but only slightly more successful, approach contemplated distribution of a "crippled" form of the fully functional product. Distribution material would include a fully functional digital product, but also safeguards incorporated into the product to prevent fully functional use until authorization, i.e., purchase, occurred. For example, a word processing program could not, in its crippled form, print a document or save a document to disk. When, following an evaluation period, the user decided to purchase the product, a purchase procedure "de-crippled" the product for fully functional use. For example, the purchaser received a "key", i.e., a predetermined coded value, required to convert the crippled form of the product to a truly fully functional form. The consumer need not physically obtain a new copy of the product at the time of purchase.

Unfortunately, users demand a truly fully functional form of the product during the evaluation period. To meet such user demand, providers of digital content now distribute a fully functional form of the digital product for evaluation, yet control in some manner the use of the product to prevent unauthorized use, i.e., prevent use beyond an allowed trial evaluation.

A "metering" mechanism used in association with a published "try before you buy" digital product places a limitation on a potential purchaser's use of the digital product. A metering mechanism is required for distribution of a fully functional version of a digital product. Otherwise, the potential purchaser has no reason to become an actual purchaser. A metering limitation might include a time period of allowed use followed by a purchase requirement for continued use. Another common metering limitation is a limited number of uses, e.g., limited number of executions, followed by a purchase requirement for continued use. Important to note, during evaluation the potential purchaser has full use of the product.

Unfortunately, converting a fully functional digital product to a metered form for distribution introduces not only a new and significant production step, but also introduces an opportunity to create flaws or "bugs" in the product. This also tends to introduce complexity into the published product not related to operation of the product itself as designed by the software developer, but complexity as related to implementation of a reliable metering function.

As digital products evolve, especially computer program products, overall size and complexity increase. Software developers hesitate to implement quick solutions for known problems, fearing introduction of yet additional problems. A particular condition or "bug" sometimes requires many specific ordered steps to manifest itself. Software developers use sophisticated software testing scripts providing repeatable recursion testing for past or known "bugs" to insure the quality of the latest version of a given program. Developers endeavor to minimize the resource usage of their products and to keep the size of the programs as small as possible. This can be an especially sensitive problem if the proposed growth of a product requires an increase in the number or type of distribution medium, e.g., adding an additional diskette to a software product is considered a costly requirement.

The need to produce a fully functional demonstration version of a product, i.e., a "try before you buy" version of a product, normally introduces a higher order magnitude of difficulty. Creating a "crippled" version of the full-functioning product and/or controlling usage and maintaining version control of both the crippled version and the non-crippled version is a daunting task, not to mention the need to execute elaborate, e.g., recursion, testing of both versions of the product. In essence, the manufacturer must provide two products instead of one, i.e., doubles the product inventory and associated testing and product management.

Most solutions for such problems faced by software developers require extensive involvement of software programmers, quality control labs, version/source control managers and, most importantly, time. Any "automated" solution to metering or to execution control usually requires the original software programmers to reprogram their final product to utilize the "automated" solution. The "automated" solution is usually in the form of additional development software provided by a third party that needs to be integrated with a final product via programming. This type of solution is commonly referred to as an "SDK" (software development kit) approach. An SDK approach to metering, however, introduces complexity and potential for programming errors unrelated to operation of the product itself. Further, and far from trivial, the use of an SDK approach adds time and cost to the development cycle.

Developers of digital products prefer to simply create the digital product without limitation or additional production steps unrelated to use and operation of the fully functional form of the product. In other words, it is difficult enough to produce a fully functional form of the product as designed without the additional complexity of incorporating safeguards against unauthorized use beyond a trial evaluation.

Thus, distribution of digital products according to the "try before you buy" method should not require that the creator of the digital product modify its design to meet a particular distribution scheme. At present, "try before you buy" distribution schemes typically require some modification of the digital product by the original developer to implement distribution in a metered form, i.e., a controllable form allowing distribution and evaluation of a fully functional product but not allowing long term use.

Ideally, digital products are produced without use limitations or safeguards, leaving the creator of the digital product exclusively to the task of implementing the digital product itself. The present invention allows a creator of a digital product to concentrate on the product itself without requiring the creator to incorporate safeguards or limitations against unauthorized use.

Digital product distribution according to the "try before you buy" distribution method is an example of a need to impose execution control over a digital product. Such execution control has nothing to do with the digital product as designed, but represents an auxiliary feature imposed upon the product and unrelated to the product's operation or function as designed. Other forms of execution control, i.e., other forms unrelated to product execution as designed, include encryption and decryption functions applied for security purposes, compression and decompression functions to conserve media storage space, long term metering of usage for billing purposes or license usage enforcement, and interfacing with other programs or systems or controlling agents to enforce ongoing authorization of use. Generally, these auxiliary control features imposed upon a digital product have purposes unrelated to the execution of the digital product as designed, but rather are imposed for other reasons.

Thus, it is desirable to impose execution control over a digital product, but undesirable to require that such execution control be integrated into the design and production of the digital product. The subject matter of the present invention advantageously isolates digital product design from imposition of auxiliary execution control.

One form or mechanism for imposing control over the execution of an application has previously been available through the use of "TSR" (terminate and stay resident) programs. A TSR program loads into a computer and remains available while any other application might be called upon to run. A TSR is normally thought of as a "DOS"-based facility, but it can provide similar services for Windows (TM) based applications as well. A Windows (TM) "device driver" or "VxD" (virtual device driver) can provide similar services only for Windows (TM)-based applications. However, the use of such TSRs or VxDs to provide execution control, e.g., for metering, is impractical because there is no mechanism to enforce the presence of such a control. The control device must accompany the application to be metered. And more importantly, it is mandatory that it be done in such fashion that metering cannot be avoided, i.e., that the application cannot run unless the metering function or control device permits it. Generally, TSRs and VxDs cannot guarantee such execution control.

Thus, there remains need for improvement in the area of execution control over existing applications. Execution control can be designed into an application. The application designer, however, most preferably ignores any such auxiliary control issues and designs the product strictly according to its intended function. Auxiliary control, preferably, is imposed upon the digital product in its final form as produced according to its design without reference to any such auxiliary control in its original design. The subject matter of the present invention provides a mechanism for imposition of execution control over an application without requiring that the application design include such control features. Under the present invention, the application may be first designed and manufactured to final form as intended with execution control imposed subsequently upon the digital product as taken in its final form.

SUMMARY OF THE INVENTION

A method of manufacturing a digital product according to the present invention includes a first manufacturing step providing the digital product in an original form including an original executable file. The original executable file upon loading for execution, causes establishment of a first operating environment necessary for execution of the original executable file. A second manufacturing step modifies the original executable file to provide a controlled form of the digital product including a controlled executable file. The controlled executable file upon loading for execution causes establishment of a second operating environment, insufficient for operation of the original executable file. The controlled executable file then selectively allows execution of the original executable file, including establishment of the first operating environment necessary for execution of the original executable file.

A method of execution control relative to an original executable digital product under the present invention may be applied to an original executable digital product causing, when loaded for execution on a given computing device by a given operating system, establishment of a first operating environment necessary for execution of the original executable digital product. By attaching control programming to the original executable digital product, a controlled executable digital product is created and provides execution control under the present invention. The controlled executable digital product when loaded for execution creates a second operating environment, insufficient for operating of the original executable digital product. The control programming selectively allows execution of the original executable digital product by selectively establishing the first operating environment and selectively passing execution control to a start address indicated in the original executable digital product.

A controlled digital product under the present invention includes a first executable portion comprising programming presenting an original digital product. The first executable portion requires for execution on a given computing device and given operating system a first operating environment and a start address. A second executable portion attaches to the first executable portion in modification thereof and thereby causes upon loading for execution establishment of a second operating environment, insufficient for execution of the first executable portion. The second executable portion selectively allows execution of the first executable portion by selectively establishing the first operating environment and selectively passing execution control to the start address indicated in the first executable portion.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention provides an ability to add various types of control functionality and/or characteristics to a digital product after its final creation by its original developer, i.e., without involving effort or even knowledge on behalf of the original developer and without use of a software development kit (SDK).

Figure 1:
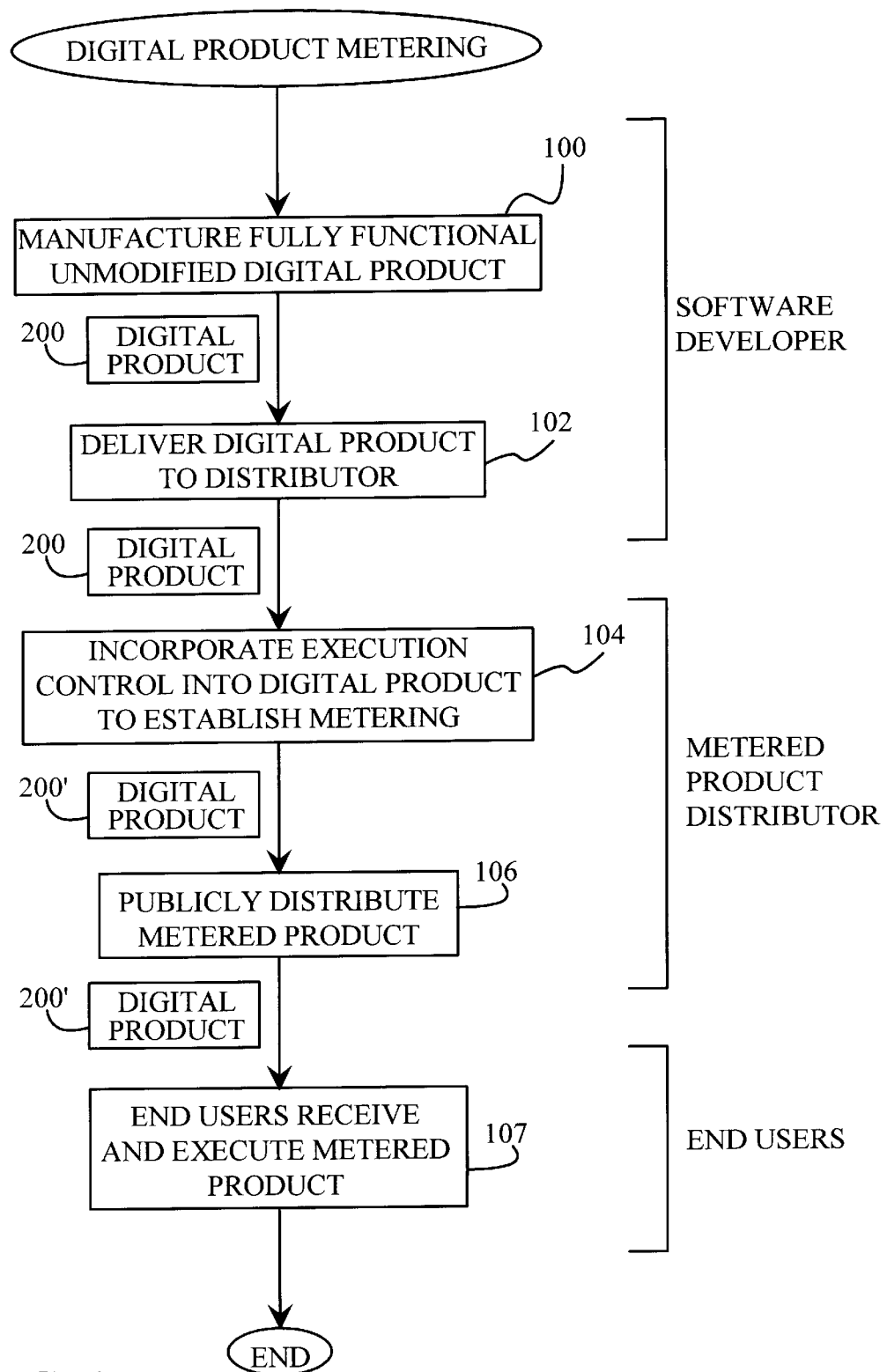
FIG. 1 is a flow chart illustrating production and distribution of metered digital products according to one embodiment of the present invention.

FIG. 1 illustrates generally one embodiment of the present invention whereby a metering function is incorporated into a previously manufactured fully functional digital product. Generally, the present invention imposes execution control over a given product to establish additional functionality, e.g., to establish a metering function relative to use of the fully functional digital product. Thus, while a metering function is shown to illustrate the present invention, other execution control functions may be incorporated into a digital product including, but not limited to, compression of critical parts of the product to allow more content to be stored on the distribution media and/or less space consumed on the final storage media (typically a hard drive); encryption of critical parts of the product providing a degree of security; long term metering of usage for billing purposes or license usage enforcement; and, interfacing with other programs or systems or controlling agents to enforce authorization of use.

In FIG. 1, digital product metering according to a preferred embodiment of the present invention begins in block 100 where a software developer manufactures a digital product 200 (FIG. 2) in its fully functional and unmodified form as intended for use by an end-user. The software developer need not be concerned with functions or design associated with a later implemented distribution scheme, e.g., a metering function or auxiliary features such as encryption or compression. The software developer need only design and implement the digital product 200 as desired without use of unrelated SDK resources. In block 102, the software developer delivers the unmodified digital product 200 to a metered product distributor, i.e., one who converts the fully functional product 200 into a fully functional but metered digital product 200' to allow controlled "try before you buy" distribution. By imposition of the present invention on the original digital product 200, one converts the original digital product 200 into a metered digital product 200' by converting an executable file 202a (FIG. 2) of product 200 into an executable file 202a' (FIG. 4) of product 200'.

In block 104, the metered product distributor incorporates execution control into the digital product 200 to produce, in the illustrated example, metered digital product 200'. In block 106, the metered product distributor makes the metered digital product 200' publicly available by free distribution of the metered digital product 200'. For example, the metered digital product 200' may be posted on bulletin boards, made available on the Internet global communication medium or distributed on CD ROM media. Because metered digital product 200' is protected against unauthorized or long term use by virtue of the metering function established, wide spread and copious distribution of metered digital product 200' is most desirable. Following public distribution of the metered product 200', end users receive, in block 107, copies of the metered product 200' for evaluation by execution thereof on a given computing device.

Thus, the software developer concentrates on his or her special expertise, i.e., producing a fully functional and reliable digital product as designed, and the metering function becomes part of the distribution process. The software developer need have no involvement in implementation of or concern regarding the metering function, or any other auxiliary function implemented under the present invention.

Figure 2:
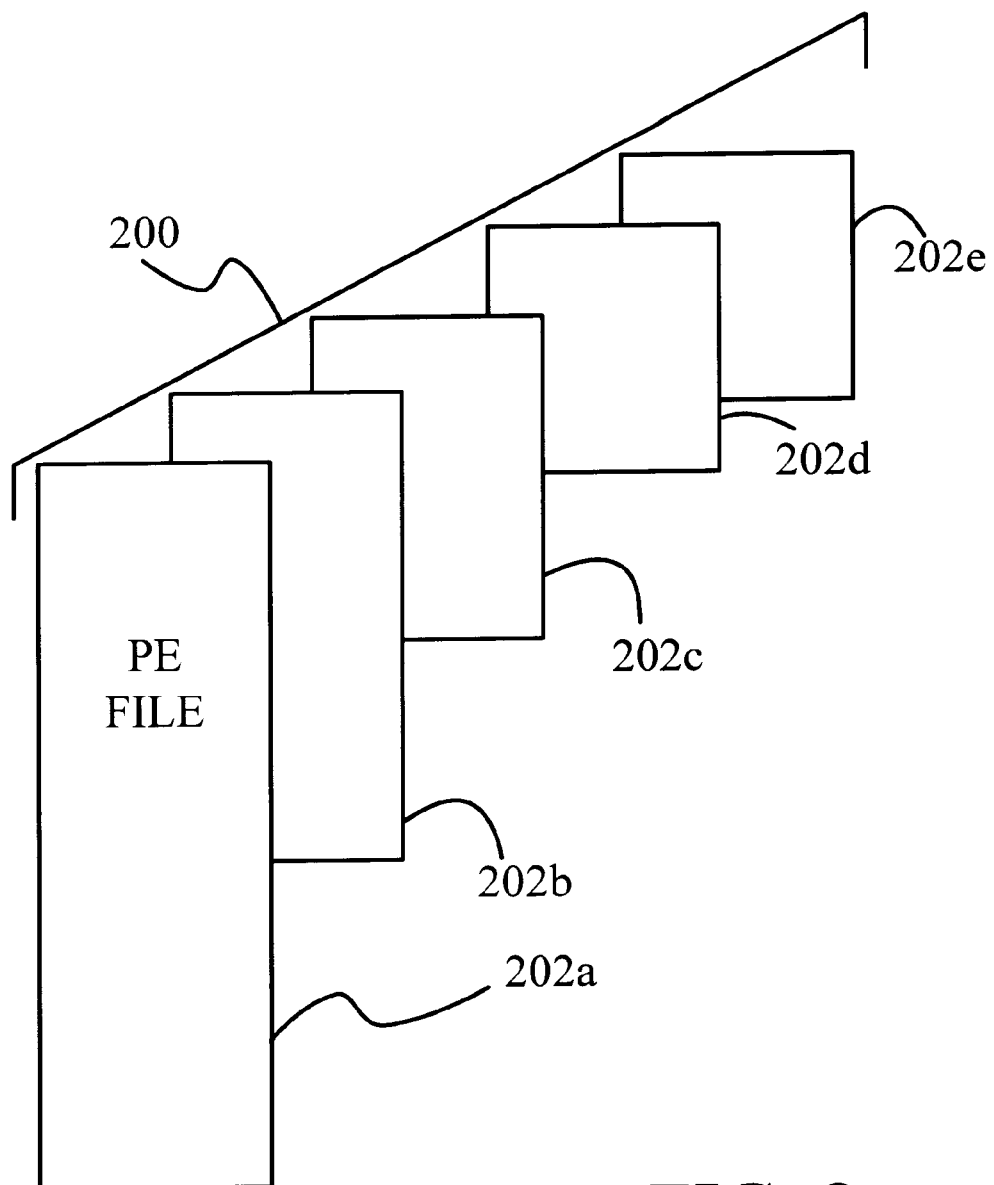
FIG. 2 is a prior art illustrates schematically various components of a digital product in its fully functional form as designed and produced by the developer without incorporating any metering function therein.

FIG. 2 illustrates schematically the conventional or original fully functional digital product 200 as produced by the software developer and ready for normal execution as designed. In other words, digital product 200 as illustrated in FIG. 2 represents the fully functional form of digital product 200 without incorporation of any features, e.g., metering features, unrelated to the operation of digital product 200. In FIG. 2, the particular digital product 200 illustrated herein includes a variety of individual components, individually components 202a–202e. As may be appreciated, any given digital product may include one such component 202 or any number or size of components 202. One of components 202, however, will be regarded as the primary executable file, i.e., component 202a in FIG. 2. In the particular embodiment illustrated herein, component 202a is a program executable under the Windows (TM) operating system and conforming to the portable executable (P.E.) file format designed for use by such operating systems as Windows NT and Windows 95. The subject matter of the present invention may be applied, however, to other file formats and operating system loading and executing methods.

Figure 3:
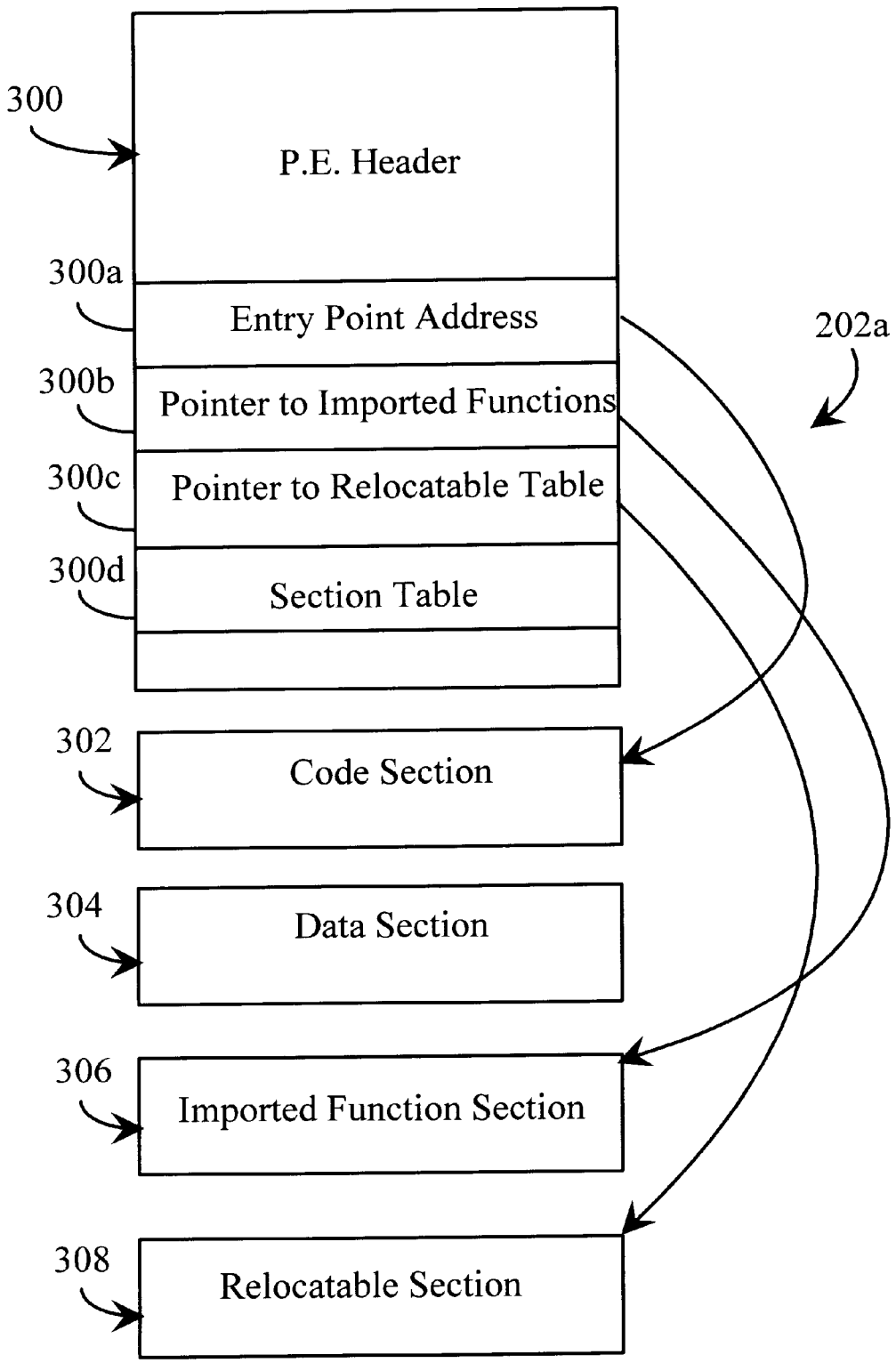
FIG. 3 illustrates partially a prior art format for an executable component of the digital product of FIG. 2.

FIG. 3 illustrates in more detail portions of the structure of executable component 202a of FIG. 2. More particularly, FIG. 3 illustrates executable component 202a in its original form as provided by the software developer, i.e., a fully functional unmodified form of the digital product 200. In FIG. 3, executable component 202a includes a P.E. header 300, a code section 302, a data section 304, an imported functions section 306, and a relocatable section 308. The structure of P.E. header 300 provides access to several pieces of information modified under the present invention. More particularly, header 300 includes an entry point address 300a indicating the location of the first program instruction to be executed following loading of component 202a. In the illustrated example, entry point address 300a points to a location in code section 302. Header 300 also includes an imported functions pointer 300b indicating the location of imported functions section 306. A relocatable table pointer 300c indicates the location of relocatable section 308. Header 300 also includes a section table 300d including an entry therein for each section of component 202a, e.g., an entry for each of code section 302, data section 304, imported functions section 306, and relocatable section 308.

Figure 4:
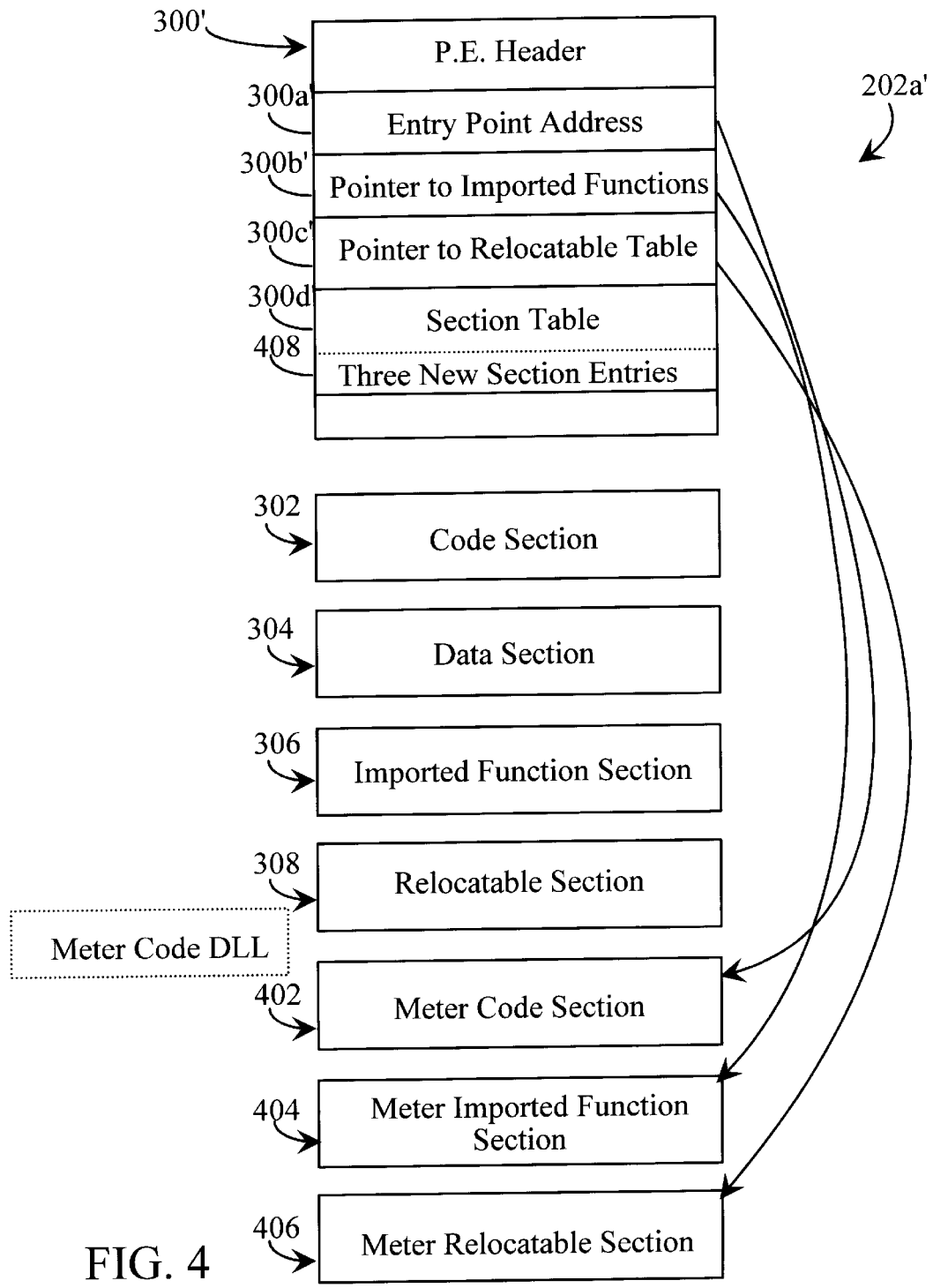
FIG. 4 illustrates partially the structure of the prior art executable file of FIG. 3, but as modified under the present invention to implement execution control establishing a metering function relative to the original digital product of FIG. 2.

FIG. 4 illustrates portions of component 202a' as modified under the present invention to implement execution control over the digital product 200. In FIG. 4, header 300' corresponds generally to the header 300 of FIG. 3 but includes modifications. Executable component 202a' includes intact the original code section 302, original data section 304, original imported functions section 306, and original relocatable section 308. In addition, the illustrated embodiment adds new sections, i.e., a meter code section 402, a meter imported functions section 404, and a meter relocatable section 406. Section table 300d' corresponds to the original section table 300d, but includes three new table entries as indicated at reference numeral 408. More particularly, the new table 300d' entries 408 correspond to the new sections 402, 404, and 406 appended to component 202a' under this particular embodiment of the present invention.

Entry point address 300a' references the beginning executable instruction in the meter code section 402. As may be appreciated, the original entry point address 300a is preserved under the present invention for later use as described more fully hereafter. The imported functions pointer 300b' points to the new meter imported functions section 404, and the original imported function pointer 300b is preserved for later use as described more fully hereafter. The relocatable table pointer 300c' indicates the location of meter relocatable section 406, and the original relocatable table pointer 300c is preserved for later use as described more fully hereafter.

Modifications imposed to create executable component 202a' allow the operating system to load component 202a' for execution, but such modifications establish execution control under programming held in the meter code section 402 or in associated programming called directly or indirectly by code section 402. As may be appreciated, limited execution control programming can be implemented in a small code section 402. However, more sophisitacated control programming can be placed in an associated external code or data file, e.g., a dynamic link library (DLL) module as available under the Windows (TM) operating system. Once code section 402 executes, any such additional programming, e.g., an associated DLL file added as a separate file but in conjunction with code section 402, may be used to implement execution control. Accordingly, it shall be understood that reference herein to execution of code section 402 shall be taken to include reference to any such additional programming added to product 200 and called directly or indirectly by code section 402.

Thus, under the illustrated embodiment, a metering function operates under the programming of code section 402, e.g., allows a limited number of metered digital products 200' executions or allows product 200' execution only during a limited time period. Once the meter code section 402 completes its metering function, e.g., determines that digital product 200' may execute, meter code section 402 processes the original imported functions section 306 and original relocatable section 308 in a manner corresponding to that normally done by the operating system. In this aspect, code section 402 emulates the load task normally conducted by the operating system. Processing control then passes to the instruction indicated in the original code section 302, i.e., control passes to the address indicated by the original entry point address 300a. The operating system has no indication that an execution control segment has been introduced into the metered digital product 200'. In other words, the operating system loads and executes executable component 202a' in a manner identical to that of 202a, but by virtue of the modifications implemented under the present invention a metering function, or auxiliary function, exists without involving the operating system in the process.

Figure 5:
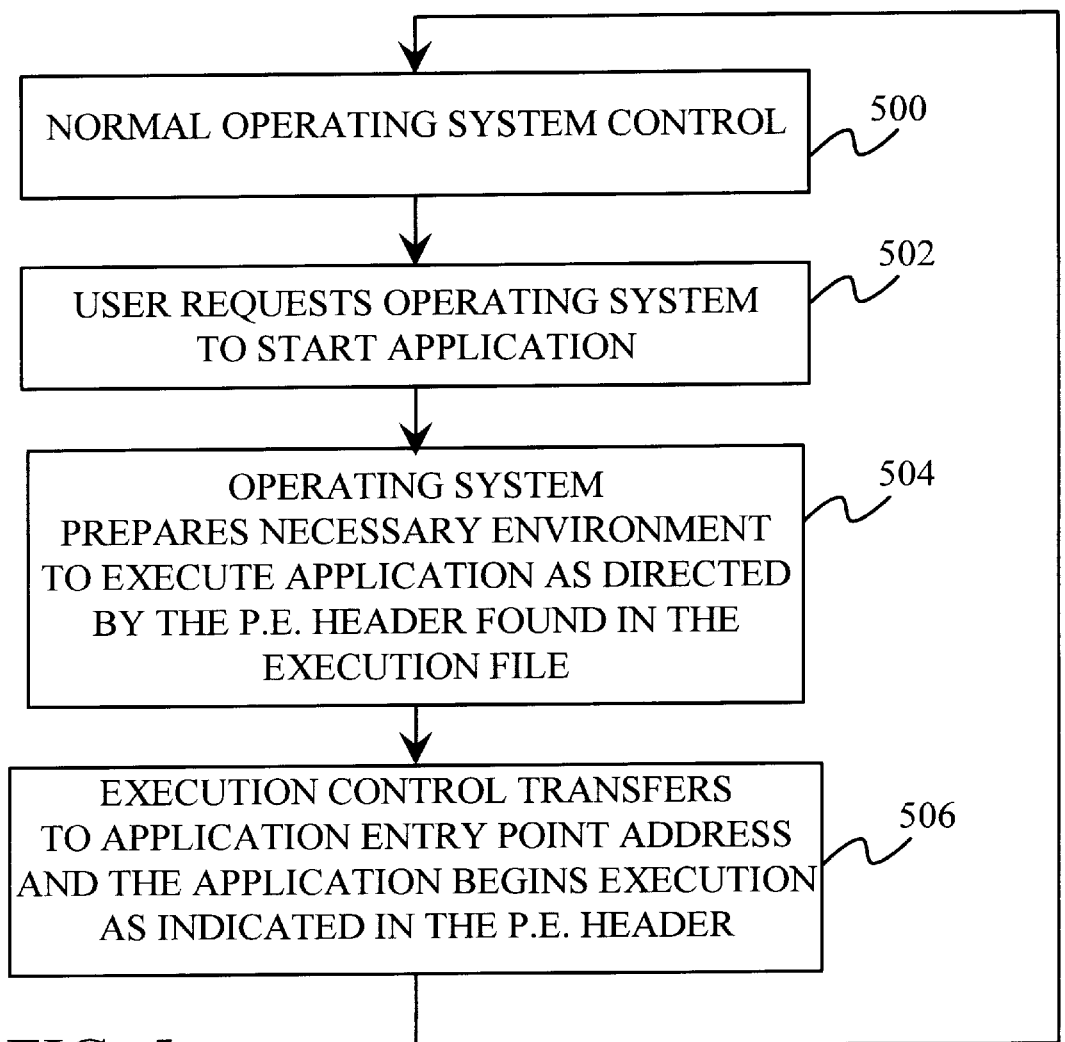
FIG. 5 is a prior art illustrating generally conventional steps executed when an operating system loads and executes the executable file of FIG. 3.

FIG. 5 illustrates in simplified flow chart form the normal loading and execution of a digital product, i.e., loading and execution of the original executable component 202a. In FIG. 5, block 500 represents normal operating system control prior to a user request to execute, for example, the original digital product 200. Processing advances to block 502 when a user requests that the operating system start an application, i.e., execute the original digital product 200. In response, the operating system prepares in block 504 the necessary environment to run the original digital product 200 including reading the executable component 202a from a storage medium.

In block 506, execution control transfers to the application, i.e., the program instruction indicated in the original entry point address 300a. Thereafter, the application executes normally. When the application terminates, control returns to block 500, i.e., normal operating system control independent of original digital product 200.

Figure 6:
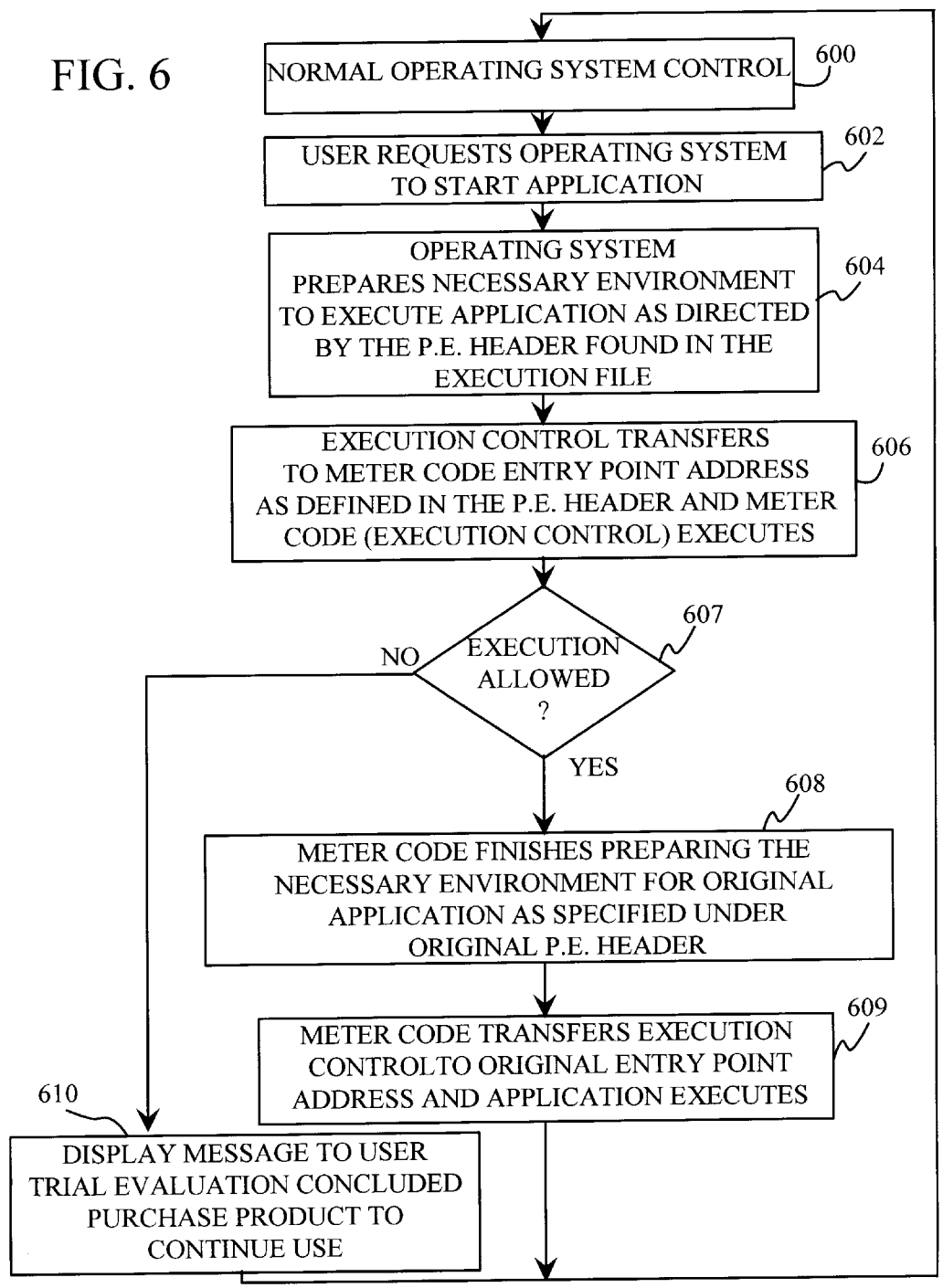
FIG. 6 illustrates by flow chart steps executed under the present invention when an operating system loads and executes the executable file of FIG. 4.

FIG. 6 illustrates loading and execution of metered digital product 200', i.e., loading and execution of component 202a'. Block 600 represents normal operating system control, i.e., normal operating system operation prior to launch or execution of product 200'. In FIG. 6, processing advances to block 602 when a user requests execution of metered digital product 200'. In block 604 the operating system prepares the necessary environment to run product 200' including reading the executable component 202a' and header structure 300' as provided under the present invention. In block 606, execution control transfers to the meter code section 402 by virtue of the modified entry point address, i.e., the entry point address 300a'.

Once execution control passes to the meter code section 402, a variety of auxiliary functions may be implemented, i.e., in the present illustration a metering function operates. Decision block 607 represents programming provided by or called by meter code section 402 and determines if continued execution of product 200' is allowed. Programming associated with decision block 607 determines according to some criteria, e.g., number of allowed executions or execution only during an allowed time period, whether the trial evaluation of metered digital product 200' remains in effect. If the trial evaluation is complete, the control passes to block 610 where meter code section 402 presents a message to the user indicating the trial evaluation has terminated and that purchase is now required to continue use. Code section 402 then terminates and control returns to block 600 for normal operating system control, i.e., as before the user initiated execution of product 200.

If continued execution of metered digital product 200' is allowed in block 607, then meter code 402 establishes in block 608 the necessary operating environment as specified in the original P.E. header 300. In particular, meter code 402 uses the original entry point address 300a, the original pointer 300b to the original imported functions section 306, and the original pointer 300c to the original relocatable section 308. Control transfers in block 609 as originally intended, i.e., transfers as intended in the original code section 302 as indicated by the original entry point address 300a.

A builder program (FIG. 7) accepts as input the original application from the original software developer, e.g., digital product 200, and converts the application into an execution controlled digital product, e.g., metered product 200'. More particularly, the builder program converts executable component 200a into executable component 200a'. In this manner, the meter code section 402 is distributed with the original application and when executed by an end-user takes control of execution and allows execution only under given conditions, e.g., execution allowed during an evaluation in the case of a metered application.

Figure 7:
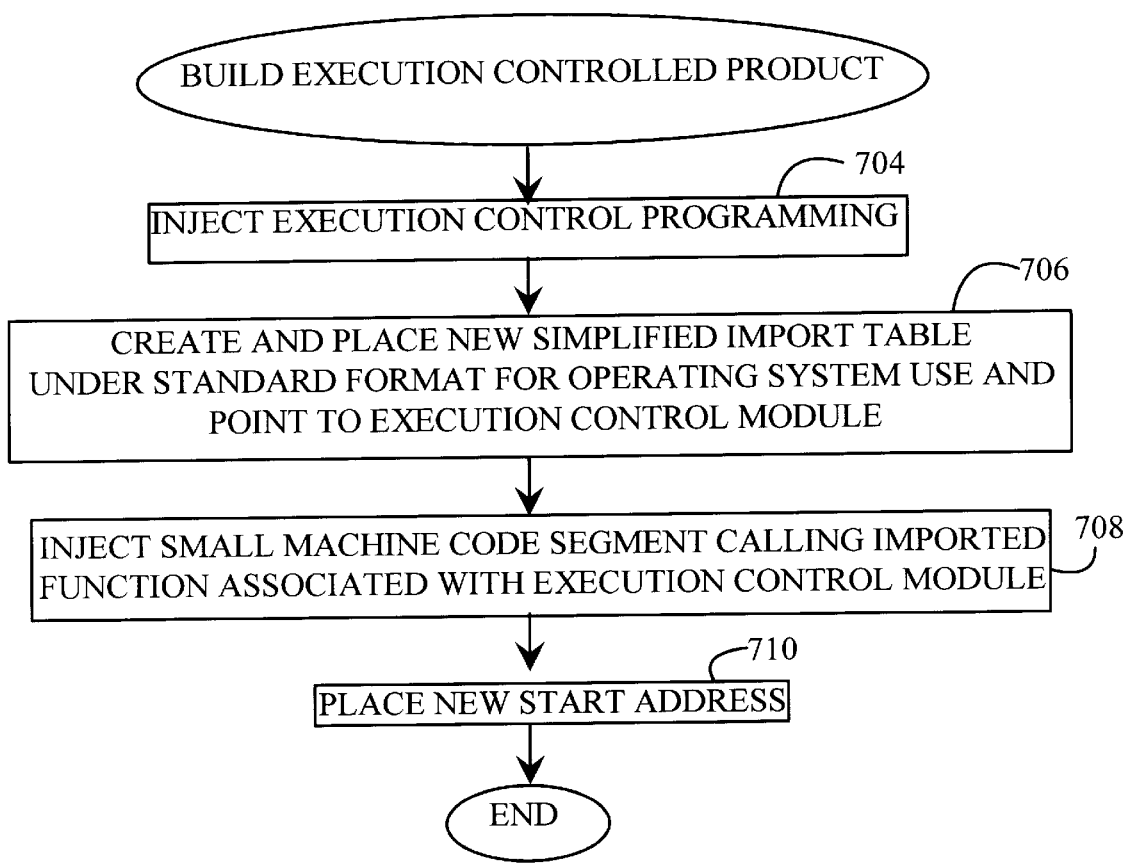
FIG. 7 illustrates by flow chart steps executed when converting an original digital product into an execution controlled digital product.

FIG. 7 illustrates generally by flow chart the operation of the builder software component responsible for modifying a given application, e.g., modify digital product 200 to include execution control, such as metered usage as provided by meter code section 402 (FIG. 4). As may be appreciated, programming illustrated in FIG. 7 need be executed only once for a given product, and thereafter copies of the modified form of the product are publicly distributed as illustrated in FIG. 1.

With respect to the Windows (TM) operating system, executable files contain an "import table" as discussed above which lists the functions the executable file uses, i.e., lists other executable files or "modules" needed for proper execution. These other "modules" typically include operating system or utility library functions. When an executable file is loaded for execution, the operating system must ensure that all modules that are referenced in the import table are loaded into the program's memory space in addition to the executable file. The operating system then determines all the resulting "entry points" of each function listed in the import table, and places the memory address of each entry point in the import table. Once the operating system has finished loading the executable and providing the proper environment, e.g., placing appropriate entry point memory addresses in the import table, the operating system allows the executable file to execute by passing control to the start address indicated in the executable file header section. The executable file expects and absolutely requires that all memory addresses of all its imported functions will be available in the import table. When invoking these modules or functions the executable file passes control to the addresses found in the imported function table.

Thus, the import table establishes a required operating environment and therefore contains critical information necessary for the operation of the executable file. Without an appropriately configured import table, i.e., appropriately configured by the operating system, the executable cannot call external functions and no useful operation occurs. In other words, the executable cannot use any modules or utilities outside that found in its own code section. Because many such functions are basic operating system functions, a corrupted import table will prevent entirely acceptable operation of a program.

In block 704 of FIG. 7, the builder programming places execution control programming in the application to be controlled, e.g., places sections 402, 404, and 406 as illustrated in FIG. 4 by appending these files to the original executable file. Any additional programming called by code section 402, e.g., an associated DLL module is also added to product 200'. As discussed previously, the section table in the header of the original file is also modified to include entries for these new sections. In block 706, the builder creates and places a new simplified import table under standard format for operating system use and points in that table to the execution control module.

As noted above, module 402 can simply be a small section of machine code which calls an associated DLL module. The bulk of execution control programming can, therefore, be located in a separate module, e.g., an associated DLL file, relative to the original application files. The injected machine code, i.e., module 402, is given control immediately upon launch, and simply calls an imported function from the DLL file as made available by reference in the metered imported functions section 404.

Generally, the builder constructs the necessary machine code bytes and injects them into the product executable file at an appropriate location, i.e., as module 402. Next, the builder updates the "code entry point" or original start address field in the executable header to reference this injected code. The operating system thereby gives control to the injected machine code, instead of the original application code, and control passes to, for example, section 402 and any associated DLL file. Thus, upon execution of the controlled product the operating system establishes an operating environment according to only the simplified import table and upon passing control to the application the programming found in the execution control module provided under the present invention executes first. Important to note, the operating system has no access to the original import table, and the original application cannot possibly execute without authorization via the execution control module as provide under the present invention.

Thus, an improved method of digital product execution control has been shown and illustrated. Execution control under the present invention may be employed to prevent unauthorized use of a digital product, e.g., beyond an evaluation period, or to implement auxiliary functions, e.g., such as compression or decompression of a digital product for purposes of storage efficiency. The present invention allows a software developer to publish a full featured version of a software package without design or implementation concerns regarding execution control, e.g., without incorporating into the design process security features against unauthorized use. The present invention converts such a full-featured version of a software package to a demonstration version allowing an end-user to make full use of the application under a controlled execution thereof. Potential customers thereby have an opportunity to evaluate fully a software package and determine whether it will meet their needs before they commit to a purchase. A purchase step may be incorporated into the execution control procedures described herein. Essentially, a purchase step would remove the effect of, e.g., by-pass, any execution control features, and allow full execution of the product without limitation.

It will be appreciated that the present invention is not restricted to the particular embodiment that has been described and illustrated, and that variations may be made therein without departing from the scope of the invention as found in the appended claims and equivalents thereof.

What is claimed is:

1. A method of manufacturing a digital product, said method comprising the steps:

a first manufacturing step providing said digital product in an original form including an original executable file, said original executable file upon loading for execution by a given computing device and given operating system would cause establishment in said computing device of a first operating environment including access to at least one of a start address, an external function, and a relocatable table necessary for execution of said original executable file and upon executing would present said digital product; and a second manufacturing step following said first manufacturing step and modifying said original executable file to provide a controlled form of said digital product including a controlled executable file, said modifying including attaching to said original executable file execution control programming whereby upon loading for execution by said given computing device and said given operating system said controlled executable file causes establishment in said computing device of a second operating environment excluding said access to at least one of said start address, said external function, and said relocatable table and thereby insufficient to allow execution of said original executable file in presentation of said digital product but sufficient to allow execution of said controlled executable file, said control programming further including programming selectively allowing presentation of said digital product, upon selecting to allow presentation of said digital product said control programming establishing said first operating environment in said computing device and passing execution control to a start address of said original executable file.

2. A method according to claim 1 wherein said first operating environment comprises references in memory devices of said computing device corresponding to functions external of said original executable file and called by said first executable file.

3. A method according to claim 2 wherein said functions are utility functions provided by at least one of said operating system and said digital product in said original form.

4. A method according to claim 1 wherein said second operating environment comprises references in memory devices of said computing device corresponding to programming functions external of said execution control programming.

5. A method according to claim 1 wherein said control programming emulates a load procedure normally executed by said given operating system when said control programming selects to allow presentation of said digital product.

6. A method according to claim 1 wherein said selectively allowing execution of said original executable digital product step comprises reference to an allowed execution condition established for an evaluation use of said digital product.

7. A method according to claim 6 wherein said execution condition corresponds to a time period.

8. A method according to claim 6 wherein said execution condition corresponds to an allowed number of executions.

9. A method of execution control relative to an original executable digital product, said original executable digital product causing, when loaded for execution on a given computing device by a given operating system, establishment of a first operating environment necessary for execution of said original executable digital product, said first operating environment including access to at least one of a first start address, an external function, and a relocatable table, said method comprising the steps:

attaching control programming to said original executable digital product to provide a controlled executable digital product, said controlled executable digital product causing when loaded for execution on said given computing device by said given operating system establishment of a second operating environment, said second operating environment including a second start address, said second operating environment excluding said access to at least one of said first start address, said external function, and said relocatable table and thereby being insufficient for execution of said original executable digital product, said control programming selectively allowing execution of said original executable digital product by selectively establishing said first operating environment and selectively passing execution control to said first start address following selective establishment of said first operating environment.

10. A method according to claim 9 wherein said first operating environment comprises references in memory devices of said computing device corresponding to functions external of said original executable file and called by said first executable file.

11. A method according to claim 10 wherein said functions are utility functions provided by at least one of said operating system and said original executable digital product.

12. A method according to claim 9 wherein said second operating environment comprises references in memory devices of said computing device corresponding to programming functions external of said execution control programming.

13. A method according to claim 9 wherein said control programming emulates a load procedure normally executed by said given operating system when allowing presentation of said original executable digital product.

14. A method according to claim 9 wherein said selectively allowing execution of said original executable digital product step comprises reference to an allowed condition established for an evaluation use of said digital product.

15. A method according to claim 14 wherein said execution condition corresponds to a time period.

16. A method according to claim 14 wherein said execution condition corresponds to an allowed number of executions.

17. A controlled digital product, said controlled digital product including and selectively executing an original digital product as provided by an original product manufacturer, said controlled digital product comprising:

a first executable portion comprising programming presenting said original digital product, said first executable portion requiring for execution on a given computing device and given operating system a first operating environment, said first operating environment including access to a first start address as a step in said first executable portion first receiving execution control upon execution of said first executable;

a second executable portion attached to said first executable portion in modification thereof and thereby causing upon loading for execution on said computing device by said operating system establishment of a second operating environment, said second operating environment including indication of a second start address as a step in said second executable portion first receiving execution control, said second operating environment excluding said access to said first start address and thereby being insufficient to allow execution of said first executable portion, said second executable portion selectively allowing execution of said first executable portion by selectively establishing said first operating environment and selectively passing execution control to said first start address.

18. A controlled digital product according to claim 17 wherein said first operating environment comprises references in memory devices of said computing device corresponding to functions external of said first executable portion and called by said first executable file.

19. A controlled digital product according to claim 18 wherein said functions are utility functions provided by at least one of said operating system and said first executionable component.

20. A controlled digital product according to claim 17 wherein said second operating environment comprises references in memory devices of said computing device corresponding to programming functions external of said second executable portion.

21. A controlled digital product according to claim 17 wherein said second executable emulates a load procedure normally executed by said given operating system when loading said first executable portion.

22. A controlled digital product according to claim 17 wherein said selectively allowing execution of said first executable portion comprises reference to an allowed condition established for an evaluation use of said digital product.

23. A controlled digital product according to claim 22 wherein said execution condition corresponds to a time period.

24. A controlled digital product according to claim 22 wherein said execution condition corresponds to an allowed number of executions.

25. A controlled digital product according to claim 17 wherein said first executable portion is integral to said second executable portion.

* * * * *